US007793278B2

(12) United States Patent
Du et al.

(10) Patent No.: US 7,793,278 B2
(45) Date of Patent: Sep. 7, 2010

(54) SYSTEMS AND METHODS FOR AFFINE-PARTITIONING PROGRAMS ONTO MULTIPLE PROCESSING UNITS

(75) Inventors: Zhao Hui Du, Shanghai (CN); Shih-Wei Liao, San Jose, CA (US); Gansha Wu, Beijing (CN); Guei-Yuan Lueh, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 1318 days.

(21) Appl. No.: 11/241,260

(22) Filed: Sep. 30, 2005

(65) Prior Publication Data

US 2007/0079303 A1 Apr. 5, 2007

(51) Int. Cl.
*G06F 9/45* (2006.01)

(52) U.S. Cl. ............... 717/160; 717/149; 717/150; 717/159

(58) Field of Classification Search .................. None
See application file for complete search history.

(56) References Cited

U.S. PATENT DOCUMENTS

| 5,584,027 | A | * | 12/1996 | Smith | 717/160 |
| 5,704,053 | A | * | 12/1997 | Santhanam | 717/158 |
| 5,781,777 | A | * | 7/1998 | Sato et al. | 717/160 |
| 5,953,531 | A | * | 9/1999 | Megiddo et al. | 717/160 |
| 6,058,266 | A | * | 5/2000 | Megiddo et al. | 717/156 |
| 6,374,403 | B1 | * | 4/2002 | Darte et al. | 717/161 |
| 6,772,415 | B1 | * | 8/2004 | Danckaert et al. | 717/161 |
| 6,952,821 | B2 | * | 10/2005 | Schreiber | 717/151 |
| 7,367,024 | B2 | * | 4/2008 | Barua et al. | 717/157 |
| 2006/0031652 | A1 | * | 2/2006 | Richter et al. | 711/165 |
| 2006/0080645 | A1 | * | 4/2006 | Miranda et al. | 717/137 |
| 2006/0123405 | A1 | * | 6/2006 | O'Brien et al. | 717/150 |
| 2007/0074195 | A1 | * | 3/2007 | Liao et al. | 717/160 |

OTHER PUBLICATIONS

Lim, Amy, "Improving parallelism and data locality with affine partitioning", *PhD Thesis, Stanford University*, (2001), 1-153.

* cited by examiner

*Primary Examiner*—Tuan Q Dam
*Assistant Examiner*—Isaac T Tecklu
(74) *Attorney, Agent, or Firm*—Schwegman, Lundberg & Woessner, P.A.

(57) ABSTRACT

Systems and methods perform affine partitioning on a code stream to produce code segments that may be parallelized. The code segments include copies of the original code stream with conditional inserted that aid in parallelizing code. The conditional is formed by determining the constraints on a processor variable determined by the affine partitioning and applying the constraints to the original code stream.

17 Claims, 5 Drawing Sheets

```
for( i = 0; i<n;i++){
    for( j = 0; j<n;j++){
        A[i][j] = A[i][j]+B[i-1][j];  (S1)
        B[i][j] = A[i][j-1]*B[i][j];   (S2)
    }
}
```

The code before affine partition

FIG. 2A

```
for(P =1-n;P<=n;P++){
    if(P>=1)B[P-1][0]=A[P-1][-1]*B[P-1][0];
    for(i=MAX(0,P) ;i<MIN(n,P+n-1);i++){
        A [i][i- P] = A[i][i-P]+B[i-1][i-P];
        B [i][i-P+1]= A[i][i-P]*B[i][i-P+1];
    }
    if(P<=0) A[P+n-1][n-1]=A[P+n-1][n-1]+B[P+n-2][n-1];
}
```

The code after transformation of affine partition

FIG. 2B

```
for( i = 0; i<n;i++){
    for( j = 0; j<n;j++){
```
    IF    $1-n < i-j \le -n*(1-\frac{1}{\sqrt{2}})$                          (C1)

A[i][j] = A[i][j]+B[i-1][j];     (S1)

IF    $1-n < i-j+1 \le -n*(1-\frac{1}{\sqrt{2}})$                   (C2)

```
for( i = 0; i<n;i++){
    for( j = MAX(0,i-n-1); j<=MIN(n-1,i-m);j++){    (B1)
        IF i-j>n                                     (C3)
            A[i][j] = A[i][j]+B[i-1][j];             (S1)
        IF i-j>=m+1                                  (C4)
            B[i][j] = A[i][j-1]*B[i][j];             (S2)
    }
}
```
    Where m is   $n*(1-\frac{1}{\sqrt{2}})$    or n*0.29289

FIG. 4B

```
/* This is part of initialization.
The data 0.292889 is 1-1/sqrt(2)
It is used to try to partition the square (iteration space) into 4 parts with
all the same area, so that each part has similar amout of task. */
m = (int) n*0.29289;

#pragma omp sections
{
#pragma omp section
   {
      ...//Here is the simplified code for the first part
   }
#pragma omp section
   {
      ...//Here is the simplified code for the second part
   }
#pragma omp section
   {
      ...//Here is the simplified code for the third part
   }
#pragma omp section
   {
      ...//Here is the simplified code for the fourth part
   }
```

FIG. 5

SYSTEMS AND METHODS FOR AFFINE-PARTITIONING PROGRAMS ONTO MULTIPLE PROCESSING UNITS

FIELD

The embodiments of the invention relate generally to partitioning code and more particularly to affine partitioning code onto multiple processing units.

BACKGROUND

From the very beginning of the computer industry, there has been a constant demand for improving the performance of systems in order to run application faster than before, or for running applications that can produce results in an acceptable time frame. One method for improving the performance of computer systems is to have the system run applications or portions of an application (e.g. a thread) in parallel with one another on a system having multiple processors. In order to run an application or thread in parallel, the application or thread must be independent, that is, it cannot depend on the results produced by another application or thread.

The process of specifying which applications or threads can be run in parallel with one another may be referred to as partitioning. One particular type of partitioning used by current systems in referred to as affine partitioning. An affine partition may be used to uniformly represent many program transformations, such as loop interchange, loop reversal and loop skewing, loop fusing, and statement re-ordering. Further, space partitioning in an affine partitioning framework may be used to parallelize code below for multiprocessor systems.

In general, an affine partition typically comprises a linear transformation and a translation of a vector or matrix operation within one or more loops, including transformation and translation of loop index variables. Various loop manipulations may be performed using affine partitioning. For example, loop interchange, loop reversal and loop skewing may be represented by linear transformations and translations performed in affine partitioning. The affine partition is an extension to unimodular transformation in use by current compilers. The affine partition extends the concept of unimodular transformation by:

i) Allowing each statement to have its own linear transformation. In comparison, for a unimodular transformation, all statements inside the loop body share one linear transformation.

ii) Allowing the partitioning to be applied to general loops structure. In comparison, a unimodular transform can only be applied to perfect nested loops.

iii) Allowing the degree of the linear transformation to be less than the nesting level of loops in the program. Namely, the transformation matrix could be non-square matrix. In contrast, a unimodular transformation requires the transformation matrix to be square matrix.

While affine partitioning has provided benefits in producing code that can be run in parallel on multiprocessor systems, there remain significant issues. For example, many times successive iterations of a loop in a program will make continuous accesses to memory. Before partitioning, memory accesses of successive iterations of a loop may be near one another, resulting in a high likelihood that a memory reference will be available in faster cache memory. However, in affine partitioning, instances of instructions in a loop may be divided across multiple processors and code may be transformed such that memory access patterns are much different than prior to partitioning. As a result, it is more likely that memory accesses may no longer be contiguous or near one another, and in fact memory accesses may be quite far from one another. In this case, there is a higher likelihood of a cache miss, thereby increasing the time required to access memory. Thus some or all of the performance gains realized by executing instructions in parallel may be lost due to the increase in memory access times due to cache misses.

BRIEF DESCRIPTION OF THE DRAWINGS

FIG. 2A is an exemplary source code fragment prior to affine partitioning and is used to illustrate the operation of various embodiments of the invention.

FIG. 2B is an exemplary code fragment after affine partitioning.

FIGS. 4A and 4B are exemplary code fragments after affine partitioning and are used to illustrate the operation of exemplary embodiments of the invention.

FIG. 5 is an exemplary code fragment illustrating the use of OpenMP in embodiments of the invention.

DETAILED DESCRIPTION

In the following detailed description of exemplary embodiments of the invention, reference is made to the accompanying drawings that form a part hereof, and in which is shown by way of illustration specific exemplary embodiments in which the inventive subject matter may be practiced. These embodiments are described in sufficient detail to enable those skilled in the art to practice the various embodiments of the invention, and it is to be understood that other embodiments may be utilized and that logical, mechanical, electrical and other changes may be made without departing from the scope of the inventive subject matter. The following detailed description is, therefore, not to be taken in a limiting sense.

In the Figures, the same reference number is used throughout to refer to an identical component which appears in multiple Figures. Signals and connections may be referred to by the same reference number or label, and the actual meaning will be clear from its use in the context of the description.

Figure 1:
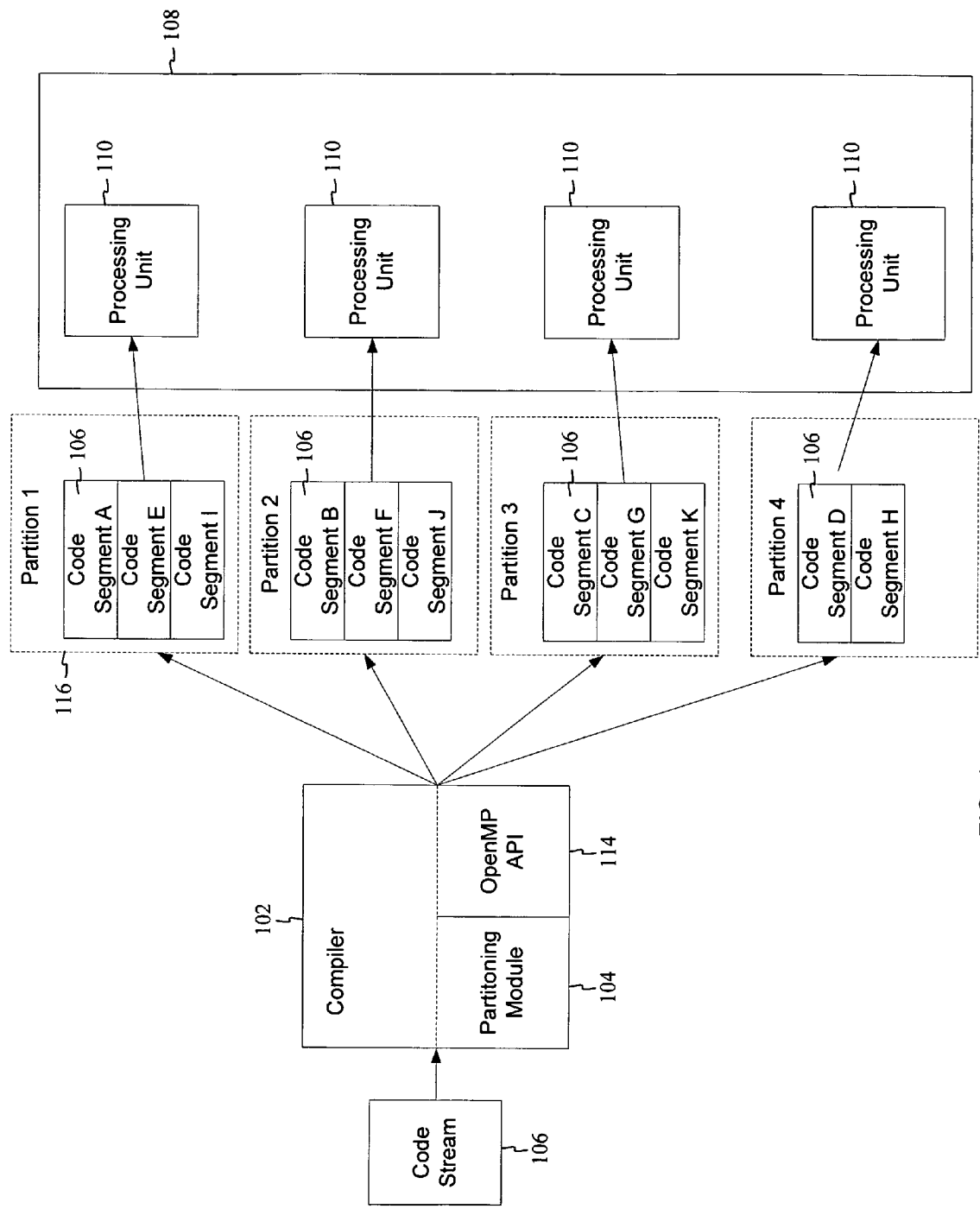
FIG. 1 is a block diagram showing hardware and software components of a system incorporating embodiments of the invention.

FIG. 1 is a block diagram showing hardware and software components of a system 100 incorporating embodiments of the invention. In some embodiments, system 100 includes a compiler 102 code stream 106 and processing units 110. In some embodiments, processing units 110 may be processing engines that are part of a multiple core processor. These types of architectures 108 are referred to as multi-core architectures. Thus, a multi-core processing architecture is logically a single processor having multiple independent processing engines (cores). In alternative embodiments, processing units 110 may be individual processors on an arc hitecture 108 that comprises a circuit board with multiple processors present on the board. In further alternative embodiments, processing units 110 may each be on a board that is part of a multiple processor board system architecture 108. In some embodiments, architecture 108 comprises an SMP (Symmetric Multiprocessing) architecture that makes multiple processing units available to complete individual processes simultaneously (multiprocessing). In SMP, any idle processor can be assigned any task, and additional processing units can be added to improve performance and handle increased loads. Further, applications can benefit from SMP or multi-core through multithreading. Multithreading provides the ability to execute different parts of a program, called threads, simultaneously.

It should be noted that while four processing units 110 are illustrated in FIG. 1, no embodiment of the invention is limited to any particular number of processing units 110. Various embodiments may have more or fewer processing units.

Compiler 102 operates to read a source code stream 106 and to translate the source code stream 106 into object code that can run on one or more of processing units 110. Source code stream 106 may be written any of a number of programming languages such as C, C++, C#, Fortran, ADA, Pascal, PL1 etc. that are now available or may be developed in the future, with compiler 102 typically configured to operate on one type of programming language. The embodiments of the invention are not limited to any particular programming language.

In some embodiments, compiler 102 includes a partitioning module 104 that analyzes portions of source code stream 106 to determine if portions of the source code can be partitioned into code segments that can be parallelized, that is, segments that can be run simultaneously on the multiple processing units 110. Partitioning module 104 may be part of an optimizer component or a front-end component of compiler 102. Partitioning module operates to perform affine partitioning of the portions of code stream 106. In general, affine partitioning divides instances of an instruction across into partitions 116. Code segments 106 (also referred to as threads) contain instances of the instructions and are assigned a partition 116. The code segments of a partition are then assigned to run on one of the processors of the multi-core or multi-processor system. Partitioning across a set of processors may be referred to as space partitioning, while partitioning across a set of time stages may be referred to as time partitioning.

Affine partitioning uses affine transformations to partition the instances. Generally speaking, an affine transformation comprises a linear transformation followed by a translation.

It should be noted that although for partition are shown in FIG. 1, the actual number of partitions may vary and will depend on the structure of the code being partitioned. Further, there may be more of fewer partitions than the number of available processors. In this case, the code segments from multiple partitions may be assigned to run on a particular processor.

In some embodiments, compiler 102 includes an OpenMP API (Application Program Interface) 114. OpenMP is a specification for a set of compiler directives, library routines, and environment variables that can be used to specify shared memory parallelism in Fortran and C/C++ programs. Compiler 102 (or a front-end for compiler 102) may produce code including directives and/or function calls to the OpenMP API The OpenMP API supports multi-platform shared-memory parallel programming in C/C++ and Fortran on numerous hardware and software architectures, including Unix, Linux, and Microsoft Windows based platforms. Further details may be found in "OpenMP Application Program Interface" version 2.5 published May 2005 by the OpenMP Architecture Review Board.

Further details on the operation of the system described above are provided below with reference to FIG. 3.

FIG. 2A is an exemplary code fragment prior to affine partitioning provided to illustrate the operation of various embodiments of the invention. As shown in FIG. 2A, the exemplary code fragment includes two nested loops with inductions variables "i" and "j" respectively. Within the inner loop, two statements (labeled S1 and S2) are specified. The example code shown in FIG. 2A will be used to illustrate aspects of the operation of system and methods of the embodiments of the invention.

The outermost loops of the code in FIG. 2A may be parallelized using affine partitioning. FIG. 2B is an example code fragment after affine partitioning performed by conventional systems. For the purposes of this specification, an instance of a statement during a particular iteration will be indicated by the values (i,j) of the induction variables during the loop iteration. In the example shown in FIG. 2B, the affine partition is:

$$\varphi_1(i, j) = [1 \quad -1]\begin{bmatrix} i \\ j \end{bmatrix} \quad (1)$$

$$\varphi_2(i, j) = [1 \quad -1]\begin{bmatrix} i \\ j \end{bmatrix} + 1$$

Where $\phi_1$ is linear transformation for statement S1 and $\phi_1$ is linear transformation for statement S2. After the transformation, statement instances with same affine mapping results are grouped into same loop iteration of outermost loop P of the example code in FIG. 2B. For example, in FIG. 2A, because the instance (1,0), (2,1), of statement S1 and instance (0,0), (1,1) of statement S2 result in a mapping to partition 1, those instances of statements S1 and S2 are all executed in the iteration P=1 in the code after transformation.

It should be noted that while the code shown in FIG. 2B can be parallelized, memory access by the code are much less likely to be continuous.

Figure 3:
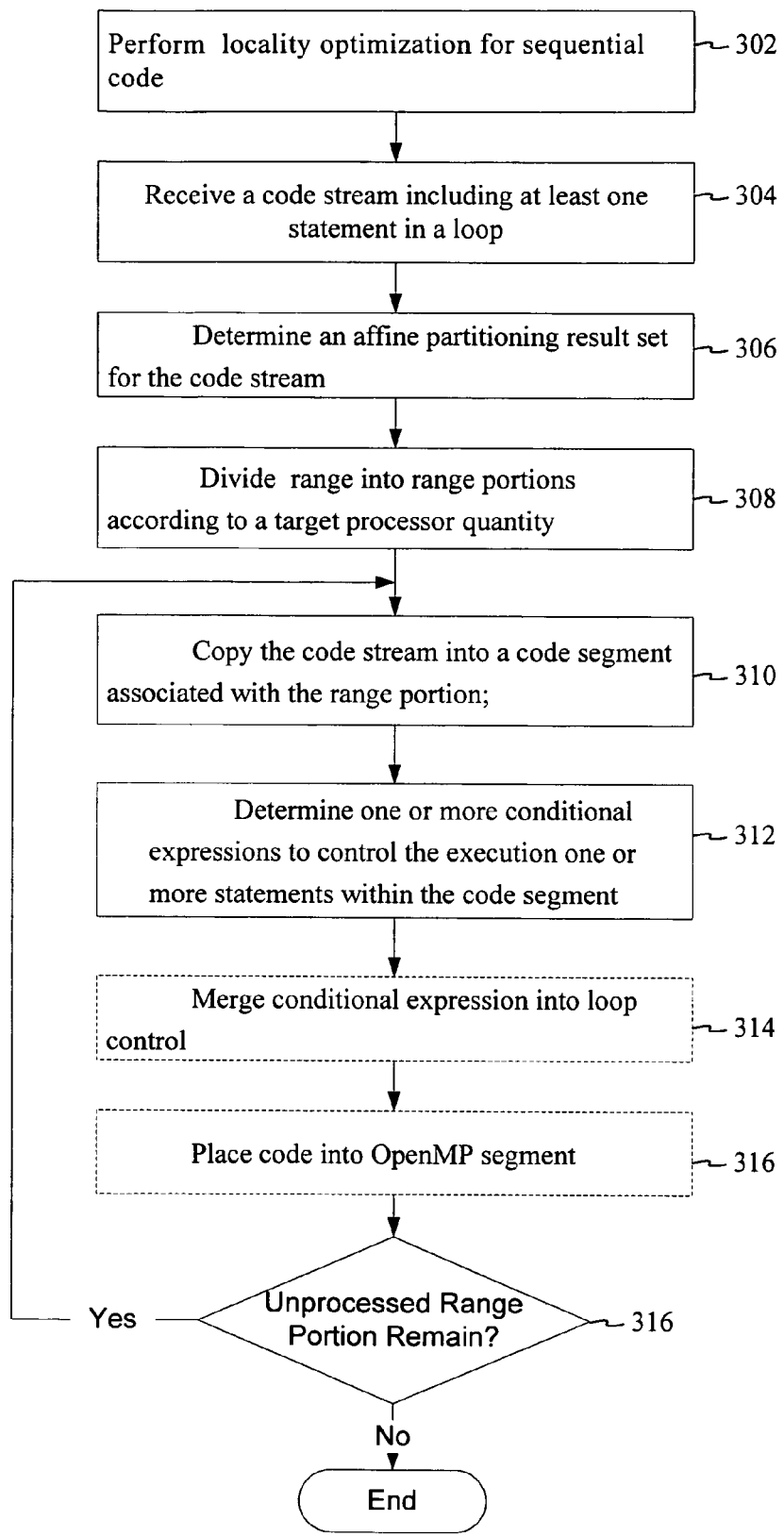
FIG. 3 is a flowchart illustrating a method for affine partitioning program code according to embodiments of the invention.

FIG. 3 is a flowchart illustrating methods for affine partitioning program code according to embodiments of the invention. The methods may be performed within an operating environment such as that described above with reference to FIG. 1 above. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from machine-readable media such as RAM, ROM, CD-ROM, DVD-ROM, hard disk, flash memory etc.). The methods illustrated in FIG. 3 are inclusive of the acts performed by an operating environment executing an exemplary embodiment of the invention.

In some embodiments, the method begins by performing locality optimization for sequential code (block 302).

Next, the system receives a code stream portion of the code being compiled (block 304). The code stream will typically comprise one or more nested loops, with one or more statements within the various body portions of the nested loops.

The system determines an affine partitioning result set (block 306). The affine partitioning will typically be a space partitioning designed to parallelize the code stream across multiple processing units. The result set may comprise a 1-order affine partitioning result set in the case where all of the processing units form a 1-dimensional processor space (e.g., processing units shares a memory bus). Higher order affine partitioning result sets may be generated when different groups of processing units share different memory interconnects. It is desirable that the affine partitions P be in the form of:

$$P = A_{i1}I_{i1} + A_{i2}I_{i2} + \ldots + A_{ik}I_{ik} \quad (2)$$

where for the i-th statement, $I_i$ is the induction variable and A is the affine transformation applied to the induction variable. In addition, $P_0$ will be used to refer to the minimal value of P and $P_L$ will be used to refer to the maximal value for P.

The system then divides the range of P (i.e. values from $P_0$ to $P_L$) into L portions that will be associated with L code segments:

$$\begin{cases} P_0 \le P < P_1 \\ P_1 \le P < P_2 \\ P_2 \le P < P_3 \\ \ldots \\ P_{L-1} \le P < P_L \end{cases} \quad (3)$$

where L is the number of processing units in the target architecture (block 308). It is desirable that the portions be divided such that each code segment contains a similar amount of code.

The system then processes the L code segments. For the t-th segment, a copy of original code stream is copied into the code segment (block 310). In addition, a conditional is determined for each statement (block 312). The conditional is determined by taking the condition $P_t \le P < P_{t+1}$ for each statement in the code and replacing P by correspondent linear formula of the induction variables. For example, the condition $P_t \le P < P_{t+1}$ becomes $$(P_t - A_{i1}I_{i1} - A_{i2}I_{i2} - \ldots - A_{i,k-1}I_{i,k-1})/A_{ik} < I_{ik} < (P_{t+1} - A_{i1}I_{i1} - A_{i2}I_{i2} - \ldots - A_{i,k-1}I_{i,k-1})/A_{ik} \quad (4)$$

In some embodiments, the conditional is then inserted into the code segment to provide for conditional execution of the affected statement or statements.

FIG. 4A is an exemplary code segment after affine partitioning provided to illustrate the operation of exemplary embodiments of the invention as described above. In the example, P may take values of 1–n to n. In an example configuration assuming a four processing unit target architecture, the range of values may be partitioned into four parts:

$$\begin{cases} 1 - n < P \le -n*(1 - 1/\sqrt{2}), \\ -n*(1 - 1/\sqrt{2}) < P \le 0, \\ 0 < P \le n*(1 - 1/\sqrt{2}), \\ n*(1 - 1/\sqrt{2}) < P <= n \end{cases} \quad (5)$$

It should be noted that is desirable to produce ranges that result in spreading the amount of code relatively evenly across the partitions while preserving memory access independence. In the example above, a diagonal partitioning of the space is assumed for the ranges in formula (5). Those of skill in the art will appreciate that other partitions are possible and within the scope of the embodiments of the invention.

As illustrated, the code segment in FIG. 4A is for the first range in formula (5) and includes a copy of the original code stream illustrated in FIG. 2A with the conditional statements C1 and C2 added as determined according to formula (4) and block 312 above. In the four processing unit example, three other code segments would be produced, each corresponding to one of the ranges shown in example formula (5). It should be noted that unlike the code shown in FIG. 2B, the code segment in FIG. 4A preserves the continuous memory access features of the original code stream, while still allowing parallelization.

Returning to FIG. 3, in some embodiments, the conditional may be further simplified by merging a portion of the conditional statement into the loop boundary conditions for the k-th loop surrounding the i-th statement (block 314). FIG. 4B provides an example code segment after merging the conditional statement into the loop boundary for the code segment illustrated in FIG. 4A.

In some embodiments of the invention, the system may create OpenMP sections (block 316). An OpenMP section may be created for each processing unit in the target architecture. Then each code segment generated as described above is placed in the corresponding OpenMP section.

FIG. 5 illustrates an example code fragment using OpenMP directives according to embodiments of the invention. Again, the example assumes a four processing unit configuration. Alternative embodiments may have more or fewer processing units. As illustrated in FIG. 5, a code segment is associated with each processor. In some cases, particularly when there may be a large number of processors and/or a large amount of code in the code segment, the size of the executable produced may be larger than desirable. Thus in alternative embodiments, a single code segment may be produced, with an additional conditional added to the code segment. The additional conditional statement is then used to control which processing unit processes a particular range of induction variables. This can result in a smaller executable at the expense of a small increase in execution time due to the added conditional.

Thus as can be seen from the above, instead of merging iterations of the transformed code (as shown in FIG. 2B), the system and methods of the invention use affine partitioning to determine the constraints on processor variable P and apply the constraints to original code directly. Thus in some embodiments, memory may be accessed in a contiguous fashion after partitioning resulting in fewer cache misses.

Systems and methods for affine partitioning code streams for parallelizing code in architectures having multiple processing units have been described. This application is intended to cover any adaptations or variations of the embodiments of the invention. It is to be understood that the above description is intended to be illustrative, and not restrictive. Many other embodiments will be apparent to those of skill in the art upon reviewing the above description. Therefore, it is manifestly intended that the inventive subject matter be limited only by the following claims and equivalents thereof.

What is claimed is:

1. A method comprising:
   receiving a code stream having at least one statement including one or more induction variables;
   determining an affine partitioning result set for the code stream, the partition result set having a processor variable, the processor variable having a range;
   dividing the range into range portions according to a target processor quantity; and
   for each range portion performing the tasks of:
      copying the code stream into a code segment associated with the range portion; and
      determining a conditional expression to control the execution of the code segment, the conditional expression including replacement of the processor variable with a corresponding transformation of the one or more induction variables;
   merging code segments for the range portions into a single code segment; and adding a conditional statement to control which processing unit processes a range of the induction variables.

2. The method of claim 1, further comprising merging the conditional expression into a loop boundary expression.

3. The method of claim 1, further comprising creating sections in an output, each section containing a code segment.

4. The method of claim 3, wherein the sections comprise OpenMP sections.

5. The method of claim 1, wherein affine partition result set includes a 1-order affine partition.

6. The method of claim 1, wherein the processor variable for the affine partition result set has the form $P=A_{i1}I_{i1}+A_{i2}I_{i2}+\ldots+A_{ik}I_{ik}$ for an i-th statement, where $I_t$ is the induction variable and A is the affine transformation.

7. A system comprising:
one or more processors
a compiler executable by the one or more processors to receive a code stream, the code stream including induction variables; and
a partitioning module executable by the compiler to:
determine an affine partition result set for the code stream, the result set including a processor variable having a range defined by constraints;
copy the code stream into a code segment of a plurality of code segments, the code segment associated with the range portion; and
apply the constraints to the induction variables of the code stream to produce a transformed code stream, the transformed code stream including the plurality of code segments to be assigned to one of a plurality of processing units, the code segments including a conditional expression to control the execution of the code segments, the conditional expression including replacement of the processor variable with a corresponding transformation of the induction variables;
wherein the partitioning module is further operable to merge the code segments into a single code segment; and add a conditional statement to control which processing unit processes a range of the induction variables.

8. The system of claim 7, wherein the partitioning module is further operable to merge the conditional expression into a loop boundary expression.

9. The system of claim 7, further comprising an OpenMP API and wherein the code segments are placed in an OpenMP section.

10. The system of claim 7, wherein affine partition result set includes a 1-order affine partition.

11. The system of claim 7, wherein the processor variable of the affine partition result set has the form $P=A_{i1}I_{i1}+A_{i2}I_{i2}+\ldots+A_{ik}I_{ik}$ for an i-th statement, where $I_t$ is the induction variable and A is the affine transformation.

12. A non-transitory machine-readable medium having machine executable instructions stored thereon for performing a method, the method comprising:
receiving a code stream having at least one statement including one or more induction variables;
determining an affine partitioning result set for the code stream, the partition result set having a processor variable, the processor variable having a range;
dividing the range into range portions according to a target processor quantity; and
for each range portion performing the tasks of:
copying the code stream into a code segment associated with the range portion; and
determining a conditional expression to control the execution of the code segment, the conditional expression including replacement of the processor variable with a corresponding transformation of the one or more induction variables;
merging code segments for the range portions into a single code segment; and
adding a conditional statement to control which processing unit processes a range of the induction variables.

13. The machine-readable medium of claim 12, wherein the method further comprises merging the conditional expression into a loop boundary expression.

14. The machine-readable medium of claim 12, further comprising creating sections in an output, each section containing a code segment.

15. The machine-readable medium of claim 14, wherein the sections comprise OpenMP sections.

16. The machine-readable medium of claim 12, wherein affine partition result set includes a 1-order affine partition.

17. The machine-readable medium of claim 12, wherein the processor variable for the affine partition result set has the form $P=A_{i1}I_{i1}+A_{i2}I_{i2}+\ldots+A_{ik}I_{ik}$ for an i-th statement, where $I_t$ is the induction variable and A is the affine transformation.

* * * * *